Sept. 10, 1963     D. W. DANFORTH     3,103,336

TAPERED PLUG VALVE

Filed July 26, 1960     2 Sheets-Sheet 1

INVENTOR.
DONALD W. DANFORTH
BY
Pearson + Pearson
ATTORNEYS

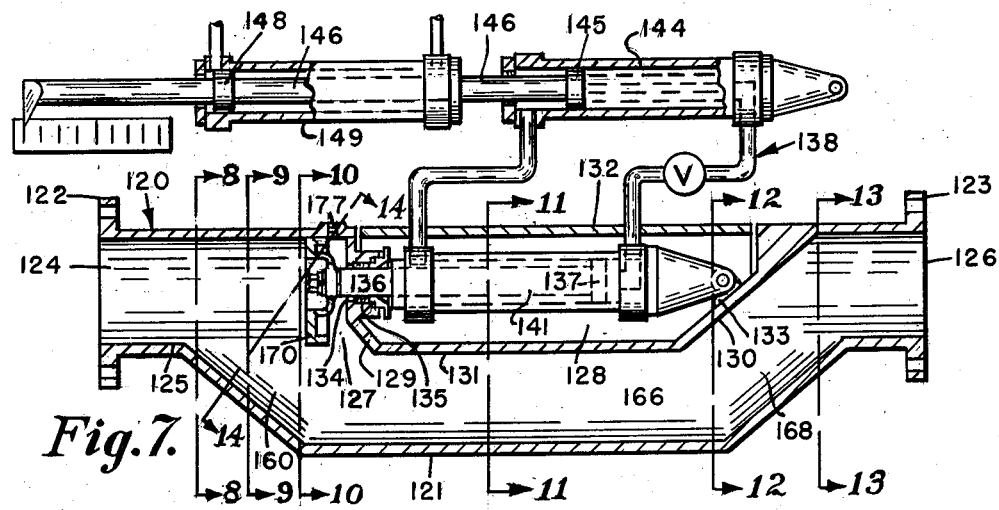
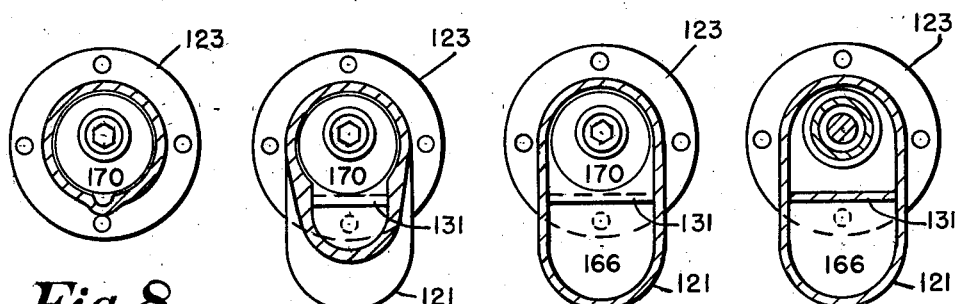
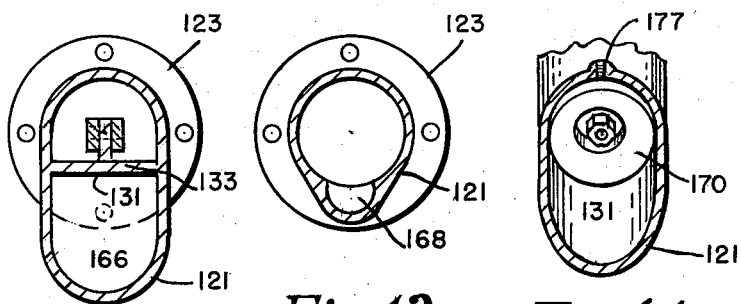
INVENTOR.
DONALD W. DANFORTH
BY
Pearson + Pearson
ATTORNEYS United States Patent Office 3,103,336
Patented Sept. 10, 1963

3,103,336
TAPERED PLUG VALVE
Donald W. Danforth, Andover, Mass., assignor to John W. Bolton & Sons, Inc., Lawrence, Mass., a corporation of Massachusetts
Filed July 26, 1960, Ser. No. 45,322
7 Claims. (Cl. 251—12)

This invention relates to valves of the proportioning, throttling or adjustable port type.

In the pulp and paper art ordinary valves which close to an elongated, thin orifice or to an annular, thin orifice are objectionable because the liquid passing through the valves contains fibres which tend to pile up in such openings. There have been many proposed valve structures for throttling the flow of liquid while maintaining a generally square, triangular or circular opening, such an orifice permitting free flow of foreign material therethrough, even when of extremely small cross sectional area. There are disadvantages to such devices for the reason that the mechanism for adjusting the area of the orifice may be costly, may require expensive seals to prevent leakage, may cause excessive turbulence and agitation of the liquid, may require cumbersome protuberances on the valve or may require a right angle turn in the conduit.

In the valve of this invention the major portion of the adjustable orifice is cast right into the housing in the form of a tapered, elongated, influent passage of generally rectangular cross section, the remaining portion of the adjustable orifice is merely a cylindrical valve plug and the housing is straight and slim for easy installation in a straight line conduit. The fluid passing through the valve and along the tapered influent passage encounters no sharp turns, twists or barrier edges and is smoothly guided slightly out of axial alignment with the conduit and then smoothly back into axial alignment therewith.

The principal object of the invention is to provide a paper stock valve with an orifice and with a tapered influent passage of constant, length-breadth ratio throughout the opening and closing cycle, the orifice varying in area but not in shape.

Another object of the invention is to provide a throttle valve having a smooth, non turbulent, flow and an axially slidable, non rotatable plug in which the percent opening is proportional to the percent of stroke length thereby achieving direct correlation.

A further object of the invention is to provide a paper stock valve having axially aligned inlet and outlet ports; a slim, substantially straight, tightly sealed housing and built-in means for varying the area of the orifice without abruptly changing the path of flow through the valve. Low pressure areas are thus minimized with the consequent air release from the valve and entrainment of the air in the fluid. Installation of the valve in straight line conduits is facilitated.

Still another object of the invention is to provide a proportioning orifice valve in which a slidable valve plug is positively actuated by an oil pressure system whereby the plug can be fixed at any desired location in its stroke, the oil system being controlled remotely by an air system.

Still another object of the invention is to provide an accurate control valve system wherein the proportioning valve of this invention serves as the inaccessible "stuff gate" valve in a paper machine but may be positively actuated from an accessible point to meter paper stock without plugging, turbulence or the like.

Other advantages of the invention will be apparent from the claims, the description of the drawing and from the drawing in which:

FIG. 7 is a view similar to FIG. 2, but on a larger scale, showing a modification of the valve and valve system of this invention, and FIGS. 8 to 14 are cross sectional views on lines 8—8 to 14—14 of FIG. 7.

Figure 1:
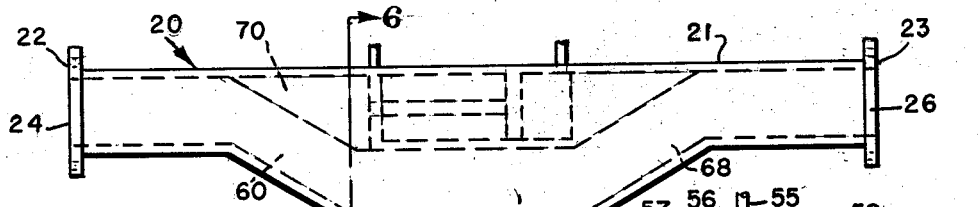
FIG. 1 is a side view of a valve constructed in accordance with the invention.

As shown in the drawing, the valve 20 of this invention includes the valve housing 21 which preferably is of hollow cylindrical cross section and is preferably straight, for conforming to a straight line fluid conduit carrying paper stock or similar fluent material.

The housing 21 includes the usual flanges 22 and 23 for connecting into a fluid line and includes an inlet port 24 including a valve plug seat 25, an outlet port 26 preferably identical in cross sectional area and shape with the inlet port and coaxial therewith. Intermediate of inlet port 24 and outlet port 26, and coaxial with the longitudinal axis of valve seat 25, housing 21 includes an elongated valve plug chamber 27 also of circular cross section. Coaxially aligned with the seat 25 and the plug chamber 27, within housing 21, is a plug actuation chamber 28 formed by the lateral partitions 29 and 30 and the bottom wall 31.

The forward partition 29 is bored at 34 and includes suitable seals and packing 35 well known in the trade for slidably receiving the piston rod 36 of a piston 37, the latter being slidable in the cylindrical plug actuation chamber 28. Actuation chamber, or cylinder, 28 forms part of a closed hydraulic system 38 containing an inflexible fluid such as oil, or any suitable fluid of low compressibility and the only apertures in the walls of housing 21 are at 39 and 40 for receiving the hydraulic conduits 42 and 43. The conduits 42 and 43 are fixed and immovable in the apertures 39 and 40 so that the valve housing 21 is completely sealed and incapable of leakage. Conduits 42 and 43 connect with a hydraulic cylinder 44 outside the valve 20, the cylinder 44 containing a slidable piston 45 having an elongated piston rod 46. The closed hydraulic system 38 also includes a shut-off valve 47 and it will be apparent that movement of the piston 45 will result in a positive and accurate corresponding movement of the piston 37 and that piston 37 may then be locked in a desired position by closing valve 47.

Piston rod 46 carries a second piston 48, within a cylinder 49 and also carries a pointer 52 which traverses indicia 53 on a panel 54 for visually indicating the position of piston 37 within valve housing 21. The piston 48 is actuated preferably by air pressure, which is normally available in manufacturing plants, through an air supply pipe 55, a three way valve 56 of any well known type and conduits 57 and 58 leading to opposite ends of cylinder 49.

The air pressure system and the cylinder 44 of the closed hydraulic system can obviously be close to the valve 20 or can be at a point remote from the valve 20, thus facilitating installation, control and supervision of the valve.

Figures 4, 5, 6:
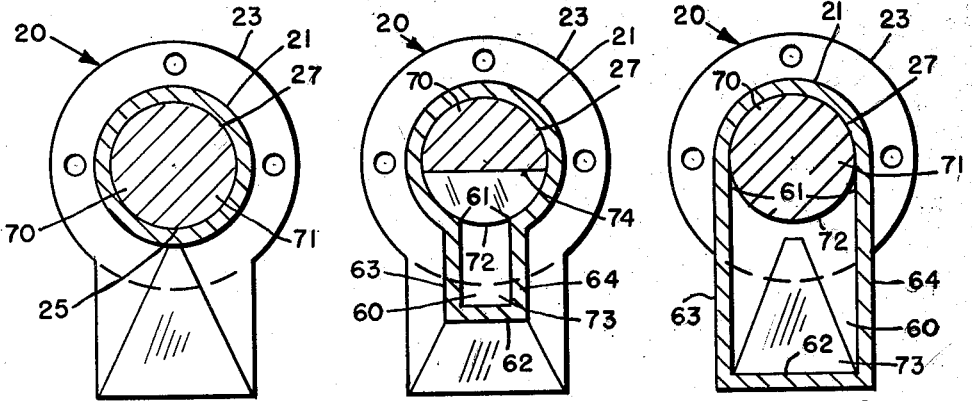
FIG. 4 is an end view in section on line 4—4 of FIG. 2, showing the valve in closed position.
FIG. 5 is an end view in section on line 5—5 of FIG. 3, showing the valve in partly open position.
FIG. 6 is an end view in section on line 6—6 of FIG. 1, showing the valve in fully open position.

The orifice forming portion of valve 20 includes a tapered, influent passage 60 preferably integral with housing 21 and preferably of rectangular cross section as best shown in FIGS. 5 and 6. Passage 60 is elongated and substantially coextensive in length with the plug chamber 27, the opening 61 of the passage 60 being in the cylindrical side wall of the chamber. The tapered influent passage 60 diverges away from the axis of the plug chamber 27, obliquely at a slight angle, to guide influent material smoothly into the chamber 66, which is in parallelism with plug chamber 27, thereby avoiding abrupt changes in flow path and turbulence. The height and width of passage 60 increases uniformly and proportionally from zero at the valve seat 25 to maximum height and width, and maximum cross sectional area, proximate the opposite end of plug chamber 27 and below the same. The bottom wall 62 diverges progressively from the plane of the opening 61 while the opposite side walls 63 and 64 of the passage diverge progressively from each other whereby the cross sectional shape of the passage remains constant throughout its length. In the preferred form of the invention, illustrated herein, the mouth 65 of the passage 60 is equal in cross sectional area to the cross sectional area of the inlet port 24 and outlet port 26 and is connected to the outlet port 26 by the elongated compartment 66 extending below the actuation chamber 28 to by-pass the actuation mechanism. Compartment 66 turns upwardly along the flat face 67 of the tapered rearward partition 30, the lower wall of the compartment being a tapered passage 68 corresponding to passage 60 for convenience of manufacture and symmetrical appearance.

Figure 2:
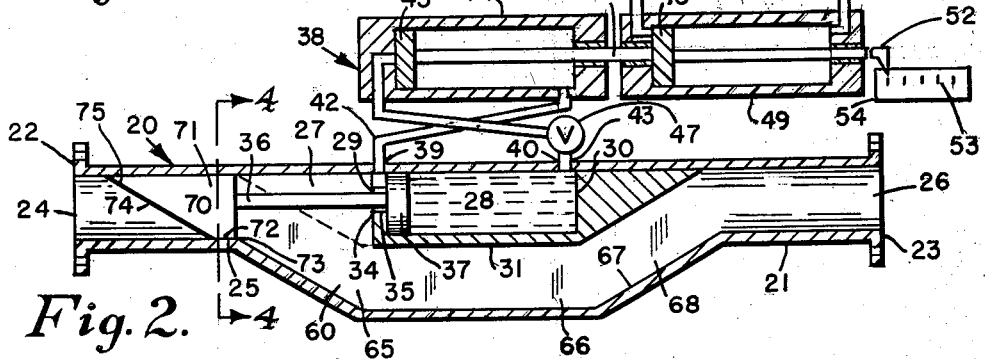
FIG. 2 is a view similar to FIG. 1, in section on line 2—2 of FIG. 3, and showing the preferred valve control system.
Figure 3:
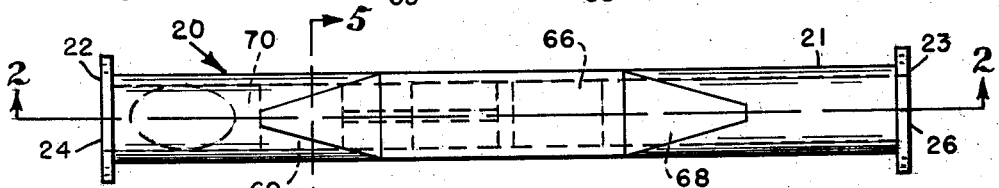
FIG. 3 is a bottom view of the valve shown in FIG. 1.

The valve plug 70 is an elongated, solid cylinder, slidably fitting the valve plug chamber 27 and having a section 71 adapted to close valve 20 when axially positioned on valve seat 25. Plug 70 is carried at the end of piston rod 36 and the portion 72 of section 71 thereof adjacent the opening 61 of tapered passage 60 is moved along the opening 61 to form the closing wall of proportioning orifice 73 in cooperation with the walls of passage 60. As shown in FIG. 2 when the piston 37 and plug 70 are in full forward position with section 72 on the valve plug seat 25, the valve 20 is closed and the orifice 73 is closed. When piston 37 and plug 70 are moved rearwardly to partially open valve 20 the orifice 73 retains its rectangular equi-sided configuration while guiding influent material into passage 60, compartment 66 and out of the port 26. As shown in FIG. 6, when piston 37 and plug 70 are in full rearward position the orifice 73 still retains its rectangular equi-sided configuration at mouth 65.

Preferably the plug 70 is substantially equal in length with the plug chamber 27 and the passage 60 alongside the plug chamber but is cut away to form the flat planar face 74. Face 74 is generally parallel to the bottom wall 62 of passage 60 and extends from the upper forward edge 75 of plug 70 at an incline down to the lower portion of the plug proximate the portion 72 of section 71. Influent material is thus smoothly guided, with no abrupt twists or turns, downwardly along passage 60, along compartment 66 and out of port 26. No perpendicular or sharp edged barriers are presented to the influent material, thereby avoiding turbulence and the piling up of fibres in paper stock lines. Plug 70 is non rotatably mounted within plug chamber 27.

Preferably non rotatability is secured by forming the bore 34, in the partition 29, at an offset from the axial centre line thereof, as shown, or by squaring the bore 34 and rod 36 or by any other suitable means.

A modification is shown in FIGURES 7 to 14 in which the valve 120 comprises the housing 121, flanges 122 and 123, inlet port 124, valve plug seat 125, outlet port 126 and plug chamber 127, all similar to corresponding elements of valve 20. The plug actuation chamber 128 includes the lateral partitions 129 and 130 and the bottom wall 131 and is provided with a removable closure cover 132 held in place by any suitable means such as machine screws not shown. Partition 129 is bored at 134 and includes the packing 135 for a piston rod 136. Piston rod 136 forms part of a commercially available hydraulic cylinder 141 having a piston 137 and mounted by the bracket 133 on the lateral partition 130 within chamber 128. The closed hydraulic system 138 includes a hydraulic cylinder 144, piston 145 and piston rod 146, identical with cylinder 141, piston 137 and piston rod 136, and in tandem with an air cylinder 149, corresponding to cylinder 49. Piston rod 146, carries a piston 148 within cylinder 149 and the device is controlled in the same manner as explained above.

The tapered, influent passage 160, of the valve 120, is of curved cross section, rather than rectangular cross section, as shown in FIGURES 8 to 14. The elongated compartment 166 and the effluent passage 168 are also of curved cross section, the elements 160, 166 and 168 otherwise corresponding to the elements 60, 66 and 68.

The valve plug 170 is an elongated, solid cylinder slidably fitting the valve plug chamber 127 and closing the valve when slidably advanced to the plug seat 125. However, the plug 170 does not include the inclined face 74 of the plug 70, and, therefore, does not possess the anti-turbulence characteristics provided by such a nose cone. A threaded plug 177 is provided in housing 121 for flushing out any accumulations of foreign matter behind plug 170 if such should occur.

I claim:

1. In a valve the combination of a valve housing having an inlet port including a valve plug seat, an outlet port and an elongated valve plug chamber, of uniform cross section coaxial with said seat, intermediate of said ports; an elongated, influent passage of generally rectangular cross section in said housing extending alongside, and opening into, said valve plug chamber, the axis of said passage being obliqued at a slight angle to the axis of said plug chamber, said passage connecting said inlet port with said outlet port and increasing uniformly and proportionally in height and width from zero at said valve seat to maximum height and width proximate the opposite end of said plug chamber; a valve plug axially movable in said plug chamber from said valve seat along the opening of said influent passage, the portion of said plug extending across the opening of said passage forming a proportioning orifice of closed configuration with the walls of said passage, and means for moving said plug along said chamber up to and away from said valve seat.

2. A valve as specified in claim 1 wherein said plug is elongated and includes a flat tapered face adjacent the opening in said influent passage for guiding influent material into said passage without turbulence.

3. A valve as specified in claim 1 wherein said ports, plug and chamber are of circular cross section, said influent passage of rectangular cross section including a divergent bottom wall and said plug including a flat tapered face substantially parallel to the bottom wall of said rectangular influent passage.

4. In a valve the combination of a valve housing having an outlet, a cylindrical plug chamber and an inlet leading axially into said chamber, a cylindrical valve plug axially movable in said chamber, an elongated, influent passage of generally rectangular cross section extending obliquely along one side of said plug chamber in said housing, said passage having an opening into the wall of said chamber and leading to the outlet of said valve, said influent passage and said opening increasing in cross sectional area uniformly and proportionally from zero at the end of said opening proximate said inlet to maximum at the opposite end of said opening for forming a proportioning orifice with said movable plug, and means for moving said plug axially in said chamber and along the opening of said passage.

5. In a valve of the proportioning orifice type the combination of a straight, elongated, valve housing having an inlet port including a valve plug seat, a valve plug chamber, a plug actuation chamber and an outlet port all axially aligned and said ports, seat and plug chamber being all of uniform diameter, a cylindrical valve plug axially slidable but not rotatable in said plug chamber, said plug having a portion cut away to form a flat planar face extending from the top at one end thereof to the bottom at the other end thereof; an elongated influent passage of rectangular cross section in said housing, coextensive longitudinally with said plug chamber and opening into the bottom thereof, said passage increasing uniformly and proportionally in cross sectional area from said valve seat to proximate and below the said other end of said plug chamber, a compartment in said housing below said actuation chamber for connecting said influent passage with said outlet port and means in said actuation chamber for sliding said plug up to and away from said valve seat along the said opening of said influent passage into said plug chamber.

6. In a valve the combination of a valve housing having an inlet port including a valve plug seat, an outlet port and an elongated valve plug chamber of circular cross section, coaxial with said seat, intermediate of said ports; an elongated influent passage of quadrilateral cross section, in said housing extending obliquely along one side of, and opening into, said valve plug chamber, said passage connecting said inlet port with said outlet port and having a pair of side walls and a bottom wall respectively increasing uniformly and proportionally in height or width from zero at said valve seat to maximum height or width proximate the opposite end of said plug chamber; an elongated cylindrical valve plug axially movable in said plug chamber from said valve seat along the opening of said influent passage, the portion of said plug extending across the opening of said passage forming a proportioning orifice of closed configuration with the walls of said passage; a flat planar face on said valve plug substantially in parallelism with the bottom wall of said passage and means for moving said plug along said chamber up to and away from said valve seat.

7. A combination as specified in claim 6 wherein said plug moving means comprises an hydraulic pressure system positively actuating said plug and a valve in said hydraulic pressure system for locking said plug at selected positions.

References Cited in the file of this patent

UNITED STATES PATENTS

| Re. 15,163 | Dunlop | July 26, 1921 |
| 1,119,060 | Bowen | Dec. 1, 1914 |
| 1,283,907 | Rigby | Nov. 5, 1918 |
| 1,550,717 | Towle | Aug. 25, 1925 |
| 1,995,561 | Belanger et al. | Mar. 26, 1935 |

FOREIGN PATENTS

| 194,995 | Germany | Feb. 4, 1908 |
| 713,595 | Germany | Oct. 16, 1941 |